US011542354B2

(12) United States Patent
Bailey et al.

(10) Patent No.: US 11,542,354 B2
(45) Date of Patent: Jan. 3, 2023

(54) CURABLE HEAT-SEAL ADHESIVES FOR BONDING POLYMERS

(71) Applicant: Arkema France, Colombes (FR)

(72) Inventors: Michael A. Bailey, King of Prussia, PA (US); Jeffrey Klang, King of Prussia, PA (US)

(73) Assignee: Arkema France, Colombes (FR)

( * ) Notice: Subject to any disclaimer, the term of this patent is extended or adjusted under 35 U.S.C. 154(b) by 105 days.

(21) Appl. No.: 17/299,364

(22) PCT Filed: Dec. 2, 2019

(86) PCT No.: PCT/IB2019/001357
§ 371 (c)(1),
(2) Date: Jun. 3, 2021

(87) PCT Pub. No.: WO2020/115559
PCT Pub. Date: Jun. 11, 2020

(65) Prior Publication Data
US 2022/0017674 A1 Jan. 20, 2022

Related U.S. Application Data

(60) Provisional application No. 62/774,405, filed on Dec. 3, 2018.

(51) Int. Cl.
*C08F 290/06* (2006.01)
*C08F 2/48* (2006.01)
*C09J 7/35* (2018.01)
*C08F 220/18* (2006.01)
*C08F 220/28* (2006.01)
*C08F 222/10* (2006.01)
*C08F 222/06* (2006.01)
*C08G 18/67* (2006.01)
*C08L 23/08* (2006.01)
*C08L 51/00* (2006.01)
*C09J 175/16* (2006.01)

(52) U.S. Cl.
CPC ............ *C08F 290/067* (2013.01); *C08F 2/48* (2013.01); *C08F 220/1811* (2020.02); *C08F 220/1818* (2020.02); *C08F 220/281* (2020.02); *C08F 222/06* (2013.01); *C08F 222/102* (2020.02); *C08G 18/672* (2013.01); *C08L 23/0853* (2013.01); *C08L 51/003* (2013.01); *C09J 7/35* (2018.01); *C09J 175/16* (2013.01); *C08G 2410/00* (2013.01); *C09J 2203/362* (2020.08); *C09J 2301/162* (2020.08); *C09J 2301/304* (2020.08); *C09J 2423/046* (2013.01); *C09J 2431/00* (2013.01); *C09J 2451/00* (2013.01); *C09J 2477/006* (2013.01)

(58) Field of Classification Search
CPC ............ C08F 2/48; C08F 2/50; C08F 220/10; C08F 220/1811; C08F 220/1818; C08F 220/281; C08F 222/06; C08F 222/10; C08F 222/102; C08F 285/00; C08F 290/067; C08F 220/1808; C08F 220/1809; C08G 18/4238; C08G 18/672; C08G 2410/00; C08G 18/48; C08L 23/0853; C08L 51/003; C08L 31/04; C08L 51/06; C09J 7/20; C09J 7/35; C09J 175/16; C09J 2203/362; C09J 2423/046; C09J 2431/00; C09J 2451/00; C09J 2477/006
See application file for complete search history.

(56) References Cited

U.S. PATENT DOCUMENTS

| | | | | |
|---|---|---|---|---|
| 5,232,767 A * | 8/1993 | Hisazumi | ............... | B32B 27/08 |
| | | | | 428/476.3 |
| 5,314,187 A | 5/1994 | Proudfit | | |
| 5,506,308 A | 4/1996 | Ahmad et al. | | |
| 6,242,503 B1 * | 6/2001 | Kozma | ................... | C08L 23/06 |
| | | | | 525/193 |
| 6,319,964 B1 * | 11/2001 | Blank | ................. | B62D 29/002 |
| | | | | 522/42 |
| 2014/0363562 A1 * | 12/2014 | Nielsen | ............. | C08G 18/4833 |
| | | | | 427/2.1 |
| 2017/0200629 A1 | 7/2017 | Tsukui et al. | | |
| 2018/0100059 A1 * | 4/2018 | Ahn | ........................ | C08J 3/247 |
| 2019/0194495 A1 | 6/2019 | Chang et al. | | |

FOREIGN PATENT DOCUMENTS

| | | | | |
|---|---|---|---|---|
| BE | 1010238 A5 * | 4/1998 | ............. | B32B 27/08 |
| CN | 102470192 A * | 5/2012 | .......... | A61L 29/085 |
| CN | 103524967 A * | 1/2014 | | |
| CN | 103525319 A * | 1/2014 | | |
| CN | 106700370 A * | 5/2017 | | |
| CN | 107502213 A | 12/2017 | | |
| CN | 111394038 A * | 7/2020 | .............. | B29D 7/00 |
| EP | 1375617 A1 | 1/2004 | | |
| JP | 4203220 B2 * | 12/2008 | | |
| TW | 201307077 A | 6/2012 | | |

(Continued)

Primary Examiner — Sanza L. McClendon
(74) Attorney, Agent, or Firm — Christopher R. Lewis

(57) ABSTRACT

Curable compositions include a urethane (meth)acrylate oligomer having a number—average molecular weight of at least 6000 g/mol; at least one mono(meth)acrylate monomer; a multifunctional crosslinking monomer chosen from acrylate monomers, methacrylate monomers, or combinations thereof; and an ethylene-vinyl acetate grafted terpolymer. The mono(meth)acrylate monomers may include a first mono(meth)acrylate with Tg between 50° C. and 175° C. and a second mono(meth)acrylate with Tg between −50° C. and 30° C. The curable compositions may be applied onto a surface of a substrate then cured to form a low-tack adhesive layer on the surface. The curable compositions may be cured by exposure to visible radiation, UV radiation, LED radiation, laser radiation, electron-beam radiation, peroxide, accelerator, or heat. Methods for bonding substrates include contacting a second substrate to a tow-tack adhesive layer on a first substrate, then heating the low-tack adhesive layer to bond the substrates and form a laminate.

22 Claims, No Drawings

(56) References Cited

FOREIGN PATENT DOCUMENTS

| | | |
|---|---|---|
| TW | 201326354 | 7/2013 |
| TW | 201326354 A | 7/2013 |
| WO | WO0075241 A2 | 12/2000 |
| WO | WO2018184847 A1 | 10/2018 |

* cited by examiner

CURABLE HEAT-SEAL ADHESIVES FOR BONDING POLYMERS

CROSS-REFERENCE TO RELATED APPLICATIONS

This application is a U.S. national stage application under 35 U.S.C. § 371 of international application number PCT/IB2019/001357, filed Dec. 2, 2019, which claims priority to U.S. patent application Ser. No. 62/774,405, filed Dec. 3, 2018.

TECHNICAL FIELD

The disclosure generally relates to adhesive compositions and, more particularly, to curable heat-seal adhesive compositions for bonding polymer substrates to form laminates.

BACKGROUND

In industrial-scale manufacturing of polymer laminates requiring bonding of two substrates through solvent-based warm-melt adhesive formulations, properties of the adhesive formulations may substantially constrain the manufacturing process to timing that can be impractical to small orders or custom orders. As an example, the manufacture of athletic shoes requires adhesive bonding of a bottom part (the sole) to a top part that covers the foot (the upper). Conventionally, the bonding of soles to uppers may be accomplished with warm-melt adhesives. Compared to hot-melt adhesives, which are generally solvent-free polymers, warm-melt adhesives are compositions containing up to 1-5 wt. % solvent in addition to polymer. The warm-melt adhesive is applied to the sole, and then the sole must be bonded to the upper within a short time after the application, before the solvent evaporates and the resulting cured adhesive becomes otherwise useless. Owing to the necessarily short timing between the application of the solvent-based warm-melt adhesive and the bonding of the two components, cost-effective attention and fast turnaround to unusual orders requires pre-assembling the shoes in anticipation of the order, thereby increasing the necessary size of a warehouse.

Accordingly, ongoing needs exist for adhesive compositions that facilitate manufacturing processes including the bonding of one polymer to another. Particularly in the manufacturing of athletic shoes, ongoing needs exist for adhesive compositions having low tack upon curing and high peel strength after heat lamination.

SUMMARY

Against the foregoing background, embodiments disclosed herein are directed to curable compositions that include at least a urethane (meth)acrylate oligomer having a number-average molecular weight of at least 6000 g/mol; at least one mono(meth)acrylate monomer; a multifunctional crosslinking monomer chosen from (meth)acrylate monomers, methacrylate monomers, or combinations thereof; and an ethylene-vinyl acetate grafted terpolymer.

Further embodiments are directed to bondable materials including a substrate and a low-tack adhesive layer on a surface of the substrate. The low-tack adhesive layer is formed by exposing a curable composition according to embodiments herein to visible radiation, UV radiation, LED radiation, laser radiation, electron-beam radiation, peroxide, accelerator, heat, or a combination of these to cure the curable composition.

Further embodiments are directed to methods for bonding a first substrate to a second substrate. The methods include applying a curable composition according to embodiments herein to the first substrate. The curable composition is exposed to visible radiation, UV radiation, LED radiation, laser radiation, electron-beam radiation, peroxide, accelerator, heat, or a combination of these to at least partially cure the curable composition and form a low-tack adhesive layer. The second substrate is contacted to the low-tack adhesive layer. The low-tack adhesive layer is heated to bond the first substrate to the second substrate and form a laminate.

Further embodiments are directed to laminates of a first substrate and a second substrate. The laminates are prepared according to the methods disclosed herein for bonding a first substrate to a second substrate.

These and other features, aspects, and advantages of embodiments of the present disclosure will become better understood with reference to the following description and the appended claims.

Additional features and advantages of the embodiments described herein will be set forth in the detailed description which follows, and in part will be readily apparent to those skilled in the art from that description or recognized by practicing the embodiments described herein, including the detailed description and claims that follow. It is to be understood that both the foregoing general description and the following detailed description describe various embodiments and are intended to provide an overview or framework for understanding the nature and character of the claimed subject matter.

DETAILED DESCRIPTION

Reference will now be made in detail to embodiments of curable compositions. Further embodiments directed to laminates formed by bonding two polymer materials with the curable heat-seal adhesives will be discussed subsequently.

It should be understood that, for all numerical values described as a range in this disclosure, an embodiment of a range from a low value to a high value includes as separate embodiments all subsets of the range. Moreover, the disclosure of two ranges as separate embodiments, each range being from a low value to a high value, includes disclosure as an additional embodiment of a third range from the low value of either one of the original two ranges to the high value of the other of the original two ranges.

Except when indicated to the contrary, as used herein, the nomenclature "(meth)acrylate monomer" encompasses acrylates, methacrylates, or mixtures of acrylates and methacrylates. Except when indicated to the contrary, as used herein, the nomenclature "(meth)acrylate oligomer" or "(meth)acrylate polymer" encompasses oligomers or polymers in which the monomers composing the oligomers or polymers may be all acrylates, all methacrylates, or a combination of acrylates and methacrylates.

Curable compositions according to embodiments include at least four components: (1) a urethane (meth)acrylate oligomer having a number-average molecular weight of at least 6000 g/mol, at least 7000 g/mol, at least 8000 g/mol, from 7000 g/mol to 75,000 g/mol, from 7000 g/mol to 75,000 g/mol, from 8000 g/mol to 75,000 g/mol, from 6000 g/mol to 50,000 g/mol, from 6000 g/mol to 30,000 g/mol, from 6000 g/mol to 20,000 g/mol, from 6000 g/mol to 15,000 g/mol, from 7000 g/mol to 15,000 g/mol, from 7000 g/mol to 12,000 g/mol, or from 8000 g/mol to 10,000 g/mol; (2) at least one mono(meth)acrylate monomer; (3) a multi-functional crosslinking (meth)acrylate monomer chosen from, acrylate monomers, methacrylate monomers, or combinations thereof; and (4) an ethylene-vinyl acetate grafted terpolymer. The four components of the curable compositions function together synergistically to provide curable compositions such as curable heat-seal adhesives that exhibit low tack upon curing and a high peel strength after thermal sealing to form a laminate of two substrates. The curable compositions may further include a tackifying resin, a photoinitiator, additional additives, or any combination of these.

In embodiments, the urethane (meth)acrylate oligomer may be derived from, meaning made from or obtained from, polyethers, polyesters, polycarbonates diols or their mixtures. In embodiments, the at least one urethane (meth) acrylate oligomer may be derived from polyesters including poly-condensation polyesters resulting from reaction of: (1) polyols and carboxylic polyacids and (2) anhydrides and polyesters resulting from ring opening polymerization of lactones, such as caprolactone. In embodiments, the urethane (meth)acrylate oligomer may be derived from polyesters, i.e., the urethane (meth)acrylate oligomer may be a polyester-based urethane (meth)acrylate oligomer.

In embodiments, the at least one urethane (meth)acrylate oligomer may have an average in number functionality, in (meth)acrylates, of from about 1.1 to about 1.9, from about 1.2 to about 1.8, from about 1.3 to about 1.8, from about 1.4 to about 1.8, from about 1.5 to about 1.7, or about 1.6. In embodiments, the at least one urethane (meth)acrylate oligomer may have a number-average molecular weight Mn of at least 6000 g/mol, at least 7000 g/mol, at least 8000 g/mol, from 7000 g/mol to 75,000 g/mol, from 7000 g/mol to 75,000 g/mol, from 8000 g/mol to 75,000 g/mol, from 6000 g/mol to 50,000 g/mol, from 6000 g/mol to 30,000 g/mol, from 6000 g/mol to 20,000 g/mol, from 6000 g/mol to 15,000 g/mol, from 7000 g/mol to 15,000 g/mol, from 7000 g/mol to 12,000 g/mol, or from 8000 g/mol to 10,000 g/mol. Number average molecular weight is characterized using an Agilent Technologies' Size Exclusion Chromatograph (SEC) using a polystyrene reference standard.

According to some embodiments, the curable compositions may include a mixture of urethane (meth)acrylate oligomers, in which each of the oligomers has a structure comprising: (1) at least one polyol backbone segment having at least one reacted end, wherein the polyol comprises polyester; (2) at least one reacted polyisocyanate forming a urethane linkage at the at least one reacted end of each of said at least one polyol backbone segment; and (3) at least one blocking end group reacted with said at least one reacted polyisocyanate to form a reversible bond, and wherein said at least one blocking end group bears a (meth)acrylate group wherein the at least one urethane (meth)acrylate oligomer has a molecular weight distribution having two primary peaks comprising a lower molecular weight peak in a range of 800 to 1,500 g/mol and a higher molecular weight peak in a range of 6,000 to 12,000 g/mol.

In such embodiments, the number of ends of each oligomer could be two, in the event that only linear polyols are used and diisocyanates or used, or it could be more than two if multifunctional polyols and/or polyisocyanates are used. The at least one urethane (meth)acrylate oligomer may include a plurality of the oligomers and all of the oligomers have a blocking end group at each of the ends of the oligomers. In such embodiments, there is either a stoichiometric equivalent amount of blocking end groups relative to polyol backbone segments and isocyanate groups of the polyisocyanates, or there is a stoichiometric excess of such blocking end groups relative to polyol backbone segments and isocyanate groups of the polyisocyanates.

In other embodiments, the at least one urethane (meth) acrylate oligomer comprises a plurality of the oligomers and the plurality comprises: (i) a first set of the oligomers having one blocking end group at least one of the ends of the oligomer and having one of the at least one polyol backbone segments with an unreacted end at least one of the ends of the oligomer and (ii) a second set of the oligomers having a blocking end group at each of the ends of the oligomer. The first set of the oligomers has a stoichiometric excess of the polyol backbone segments relative to the blocking end group. In some embodiments, the mixture of oligomers is a distribution of various oligomers in which the ratio of the number of reacted blocking end groups divided by the number of oligomers in the mixture (defined herein as "X") varies. In such embodiments, X may lie between 1 and about 3, preferably from about 1.25 to about 2.25, and most preferably from about 1.8 to 1.99. It should be pointed out that these X values refer only to oligomers as described above, even though such oligomers might be combined with other oligomers that do not contain any reacted blocking end groups in a curable composition. The value of X may exceed two when a trifunctional polyol (e.g., triethanol amine) or a polyol of even greater functionality is used and/or a polyisocyanate is used. When only difunctional polyols and diisocyanates are used, the value of X is from 1 to 2 (or equal to 2 in the presence of a stoichiometric equivalent or excess of blocking end groups or used) and preferably from about 1.8 to about 1.99.

In some embodiments, the urethane (meth)acrylate oligomer is represented by Formula (I) and shows: (1) a single polyol backbone segment having one reacted end and one unreacted end, wherein the polyol is a polyester; (2) a reacted polyisocyanate (namely a diisocyanate) forming a urethane linkage at the reacted end of the one polyol backbone segment; and (3) a blocking end group reacted with the reacted polyisocyanate to form a reversible bond, and wherein the blocking end group bears a (meth)acrylate group. Thus, the oligomer of Formula I is an example of the first set of oligomers mentioned above having one blocking end group at one of the end of the oligomer and having one of the polyol backbone segments with an unreacted end at one end of the oligomer.

(Formula I)

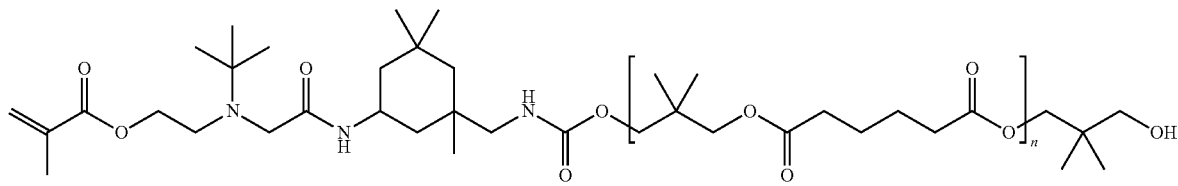

Formula I shows an oligomer having only one polyol backbone segment (having n repeat units) with just one reacted end and only one reacted diisocyanate forming, at its first end, the urethane linkage at the reacted end of the polyol backbone segment. The urethane (meth)acrylate oligomer of Formula I also only has one blocking end group reacted with the reacted diisocyanate to form a reversible bond at the second end of the reacted diisocyanate. In Formula I, the blocking end group comprises a (meth)acrylate group and is tert-butyl aminoethyl methacrylate (t-BAEMA). Thus, the reversible bond is a urea linkage in this embodiment.

The polyester segment in the urethane (meth)acrylate of Formula I is a possible option for the polyol segment. As stand-alone segments, each polyol segment is terminated by a hydroxyl group; however, upon reaction with an adjacent isocyanate group, the hydrogen of such hydroxyl group is liberated to form the urethane linkage as in Formula I. Accordingly, in this embodiment, the only diisocyanate has a urethane linkage at one end where it is reacted with a polyol segment and a urea linkage at its other end where it is reacted with the blocking end group. In other embodiments, there are additional diisocyanates and polyol segments, and possibly a second blocking end group, as shown in Formula II:

polyol segments. As can be envisioned, if a higher functional polyisocyanate is used (e.g., a triisocyanate), then any combination may be used, such as a triisocyanate attached at each isocyanate group to a polyol segment, such as in the case of a non-terminal triisocyanate, or one or two of the isocyanate groups could be reacted with a blocking end group.

The at least one polyol backbone segment of the urethane (meth)acrylate oligomer, having reacted ends, includes a polyester. Preferably, the at least one polyol backbone segment excludes polyether. In other embodiments, the at least one polyol backbone segment consists essentially of, or consists of, polyester. The at least one polyol backbone segment may be branched or linear and can be substituted or not. The molecular weight distribution having two primary peaks can be attained by using a particular polyester having a suitable molecular weight distribution. It can also be attained by using a blend of a high molecular weight polyester and a low molecular weight polyester.

In embodiments, each urethane (meth)acrylate oligomer may contain any suitable number of polyol backbone segments as appropriate for the desired properties of the composition and cured composition. Preferably, each oligomer in a mixture may contain on average between 1 and 8, (Formula II)

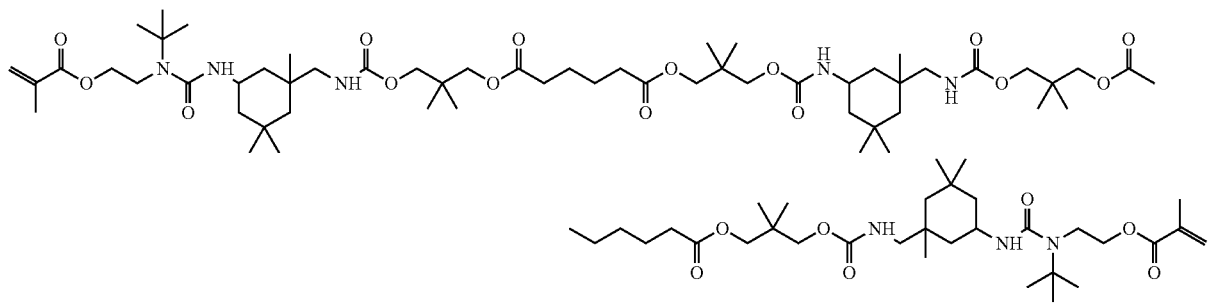

In the urethane (meth)acrylate oligomer of Formula II, three polyisocyanates (namely, diisocyanates) are shown in the oligomer, but a wide range of polyisocyanates may be included in each oligomer. In Formula II, the two terminal diisocyanates are reacted, at one end, to a blocking end group to form the reversible bond (i.e., the urea bond as shown) and are reacted at their other end with a hydroxyl of an adjacent polyol segment to form a urethane bond. These terminal diisocyanates are the furthest left and right diisocyanates in the oligomer of Formula II. The diisocyanate in the middle of the oligomer of Formula II is reacted at both of its ends with respective hydroxyl groups of adjacent polyol segments. In other embodiments, the oligomer has additional diisocyanates and additional corresponding preferably between 1 and 6, and most preferably between 2 and 4 polyol backbone segments. Of course, the number of polyol backbone segments may vary from oligomer to oligomer in a mixture and depends on a number of factors, including the desired molecular weight of the oligomer and the molecular weight of each segment. Moreover, the molecular weight of each polyol backbone segment may vary over a suitable range, again depending on the desired properties of the composition. In embodiments of the invention, the number average molecular weight of each polyol segment may vary between about 200 and about 8000 g/mol, preferably between about 500 to about 4000 g/mol, most preferably between about 500 to about 2000 g/mol. By having at least one reacted end, each polyol segment has at least one end whose hydroxyl group has reacted with an isocyanate to form the urethane linkage shown in Formulas I and II. Such a reaction is shown here, in Scheme I:

(Scheme I)

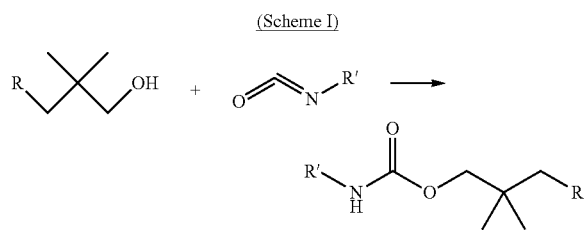

In some embodiments, polyester may form the polyol backbone of the urethane (meth)acrylate oligomer. Furthermore, it has been found especially advantageous, when seeking a curable composition which, when cured, has improved peel and shear properties, to provide a blend of at least two different polyol backbone segments in which the ratio of high molecular weight polyester to low molecular weight polyester ranges from about 1:8 to 3:1, preferably 1:4 to 2:1, most preferably 3:10 to 1:1. As used in this context, the high molecular weight polyester has a number average molecular weight of from about 6,000 g/mol to about 12,000 g/mol (preferably from about 7,000 to about 11,000 g/mol), and the low molecular weight polyester has a number average molecular weight of from about 800 g/mol to about 1,500 g/mol (preferably from about 1,000 g/mol to about 1,400 g/mol). In most cases discussed herein, the polyol backbone segment has a functionality (before reaction, valence afterwards) of two, but it can vary depending on the desired properties of the curable composition and cured product. The polyol backbone segment may have a functionality of at least two, preferably between 2 to 4, and most preferably is difunctional.

As shown in Formulas I and II above, the urethane (meth)acrylate oligomer according to some embodiments may include at least one reacted polyisocyanate (shown in Formulas I and II as a diisocyanate) forming a urethane linkage at the at least one reacted end of each of the at least one polyol backbone segment. As described above, these may be terminal diisocyanates, which are reacted at one end to a blocking end group to form the reversible bond and at their other end with a hydroxyl of an adjacent polyol segment. If only one diisocyanate is present in the oligomer, it will be a terminal diisocyanate. In embodiments in which greater than two diisocyanates are present, then all of the non-terminal diisocyanates will be reacted with adjacent polyol segments, as shown in Formula II. In some embodiments, the polyisocyanate is a diisocyanate, and the diisocyanate may be any number of suitable diisocyanates and may be selected from the group consisting of isophorone diisocyanate, toluene diisocyanate, hexamethylene diisocyanate, trimethylhexamethylene diisocyanate, and dicyclohexylmethane-4,4'-diisocyanate. In other embodiments, the polyisocyanate may be polymeric diisocyanates, such as biurets or isocyanurates. Preferably, the diisocyanate is isophorone diisocyanate.

As shown in Formulas I and II above, the urethane (meth)acrylate oligomer according to embodiments may include at least one blocking end group reacted with the at least one reacted diisocyanate to form a reversible bond, and wherein the at least one blocking end group bears a (meth) acrylate group. The blocking end group can be selected from a wide range of possibilities so long as it is able to react with an isocyanate group and form a reversible bond. The bond may be reversible by any number of external stimuli, such as heat, light, chemical reaction, or mechanical stress. Any bond that becomes labile under any of such external stimuli is suitable for the present invention. In the examples shown in Formulas I and II, the tert-butyl amino group forms a urea bond with the adjacent diisocyanate, which is labile at elevated temperatures, such as at 100° C. The at least one blocking end group comprises a functional group adapted to form the reversible bond with the diisocyanate. The functional group adapted to form the reversible bond with the diisocyanate may be selected from the group consisting of alcohols, phenols, pyridinols, oximes, thiophenols, mercaptans, amides, cyclic amides, imides, imidazoles, imidazolines, pyrazoles, triazoles, amidines, hydroxamic acid esters, uretdiones, and sterically hindered amines. Preferably, the functional group comprises a sterically hindered amine, and the reversible bond is a urea bond, and the external stimuli to reverse the reaction and thereby decouple the urea bond is heat. Still more preferably, and as shown in Formulas I and II, the at least one blocking end group is tert-butyl aminoethyl methacrylate (t-BAEMA), and the reversible bond is a urea bond.

In embodiments, the curable compositions include, in addition to the at least one urethane (meth)acrylate oligomer, at least one mono(meth)acrylate functional monomer. Examples of mono(meth)acrylate functional monomers include, for example, alkoxylated tetrahydrofurfuryl (meth) acrylate, isobornyl (meth)acrylate, tetrahydrofurfuryl (meth) acrylate, caprolactone (meth)acrylate, 2-(2-ethoxyethoxy) ethyl (meth)acrylate, 2-phenoxyethyl (meth)acrylate, tetrahydrofurfuryl methacrylate, isooctyl (meth)acrylate, 2-octyl (meth)acrylate, 2-ethylhexyl (meth)acrylate, isodecyl (meth)acrylate, ethoxyethoxyethyl (meth)acrylate, polyethylene mono (meth)acrylates, neopentyl glycol (meth)acrylates and alkoxylated analogues thereof, as well as caprolactone-based (meth)acrylates prepared by addition of one, two, three or more moles of caprolactone to a hydroxyalkyl (meth)acrylate such as hydroxyethyl (meth) acrylate ("caprolactone adducts of hydroxyalkyl (meth)acrylates") and combinations thereof.

In embodiments, the curable compositions may include at least two mono(meth)acrylate functional monomers. The mono(meth)acrylate functional monomers may include a moderate-Tg mono(meth)acrylate having a first glass transition temperature and a low-Tg mono(meth)acrylate having a second glass transition temperature less than the first glass transition temperature. In such embodiments, the first glass transition temperature may range from greater than 30° C. to about 175° C., such as from about 50° C. to about 175° C., from about 50° C. to about 150° C. or from about 75° C. to about 130° C., from greater than 30° C. to about 70° C., from about 50° C. to about 70° C., or from about 90° C. to about 120° C., or from about 100° C. to about 120° C., or from about 110° C. to about 115° C. The glass transition temperature as described herein is measured using Differential Scanning calorimetry (DSC) according to ASTM E-1356. Also in such embodiments, the second glass transition temperature may range from about −50° C. to about 30° C., such as from about −50° C. to about 10° C., from about −40° C. to about 0° C., from about −30° C. to about 0° C., or about −30° C. to about −10° C. Except where noted otherwise to the contrary, the glass transition temperatures referred to herein are glass transition temperatures measured by differential scanning calorimetry using techniques known in the art. Examples of low-Tg monofunctional (meth)acrylate monomer include butyl (meth)acrylate, octyl (meth)acrylate, iso-octyl (meth)acrylate, decyl-(meth)acrylate, isodecyl (meth)acrylate, ethoxylate tetrahydrofuryl (meth)acrylate, tert-butyl (meth)acrylate, and tert-butyl methacrylate. Examples of moderate-Tg monofunctional (meth)acrylate monomer may include monofunctional (meth)acrylate bearing at least one cycloaliphatic group such as isobornyl (meth)acrylate, for example.

In embodiments, the curable compositions include at least one multifunctional crosslinking monomer chosen from (meth)acrylate monomers, methacrylate monomers, or combinations thereof. In examples, the multifunctional crosslinking monomer may be a difunctional monomer such as a diacrylate or a dimethacrylate. Examples of dimethacrylate monomers include 1,4 butanediol dimethacrylate, hexanediol diacrylate, PEG diacrylate, 1,3-butylene glycol di(meth) acrylate, butanediol di(meth)acrylate, 1,6-hexanediol di(meth)acrylate, alkoxylated hexanediol di(meth)acrylate, alkoxylated aliphatic di(meth)acrylate, alkoxylated neopentyl glycol di(meth)acrylate, dodecyl di(meth) acrylate cyclohexane, dimethanol di(meth)acrylate, diethylene glycol di(meth)acrylate, dipropylene glycol di(meth)acrylate, n-alkane di(meth) acrylate, polyether di(meth) acrylates, ethoxylated bisphenol A di(meth)acrylate, ethylene glycol di(meth)acrylate, neopentyl glycol di(meth)acrylate, polyester di(meth)acrylate, polyethylene glycol di(meth)acrylate, polypropylene glycol di(meth)acrylate, propoxylated neopentyl glycol diacrylate, tricyclodecane dimethanol diacrylate, triethylene glycol di(meth)acrylate, tetraethylene glycol di(meth)acrylate tripropylene glycol di(meth)acrylate, dicyclopentadiene di(meth)acrylate, dodecanediol di (meth)acrylate, dodecane di (meth)acrylate, and combinations thereof.

In embodiments, the curable compositions include an adhesion promoter or multiple adhesion promoters. The adhesion promoter may include an ethylene-vinyl acetate grafted terpolymer such as an ethylene-vinyl acetate-maleic anhydride grafted terpolymer, for example. The adhesion promoter may include an acid-ester adhesion promoted such as a mixture of methacrylate acid ester and 2-(2-ethoxyethoxy)ethyl acrylate, for example.

In further embodiments, the adhesion promoter(s) may include butanediols such as 1,3-butanediol or 1,4-butanediol, metacresol, carvacrol, glycerol, glycols, butanols such as n-butanol or isobutanol, benzyl alcohol, butyl glycol, butyl diglycol and limonene, and mixtures thereof. In still further embodiments, the adhesion promoter(s) may be functional solvents capable of reacting or interacting within the curable composition. The functional solvent(s) may be chosen from compounds comprising at least one —OH, —COON or —NH$_2$ function, borne by a backbone that is in particular aliphatic, cycloaliphatic or aromatic. In particular, functional solvents that may be mentioned include thymol, carvacrol, butanols, butanediols, butyl glycol, butyl diglycol, glycerol, benzyl alcohol and metacresol, and mixtures thereof.

In embodiments, the curable compositions optionally may include at least one tackifying resin. Examples of tackifying resins include, without limitation, Sylvatac® RE25, Sylvatac® RE40, Sylvalite® RE10L, and Sylvalite® 80HP (all available from Kraton); and Teckros® HRL and Teckros® RL5 (both available from Teckrez). The tackifier may have a softening temperature of less than or equal to 80° C., as measured by Ring and Ball method (e.g., according to ASTM D6493). The tackifying resin may be chosen from piperylene-based hydrocarbon resins that may be hydrogenated, or from hydrogenated or non-hydrogenated rosin esters, or from rosin esters modified by maleic anhydride.

Additional suitable tackifying resins include, for example, collophony, collophony esters, hydrogenated collophony, polyterpenes and derivatives, aromatic or aliphatic petroleum resins and hydrogenated cyclic resins. These resins typically have a ring-and-ball softening point between 25° C. and 180° C. and preferably between 50° C. and 135° C. Other suitable tackifying resins include any of the essentially saturated thermoplastic resin polymers known in the art for their tackifying properties, such as rosin esters, hydrogenated esters of rosin, modified rosin esters, esters of polymerized rosin, esters of hydrogenated rosin, hydrocarbon resins, polyalphamethylstyrene, alpha pyrene terpene resins, polyalphamethylstyrene, alpha pyrene terpene resin, vinyl toluene/alphamethylstyrene copolymer resins, beta-pinene terpene resins, polycyclic hydrocarbon resins, and the like. The hydrocarbon elastomers are preferred. The tackifying resins may be resins based on rosins, such as Foral AX resins, or on rosin ester, such as Foral F85, resins known under the pure monomer name, such as Krystallex F85, polyterpene resins, such as Dercolyte A 115 from DRT, hydroxylated polyester resins (typically Reagem 5110 from DRT), terpene styrene resins (typically Dercolyte TS 105 from DRT), pentaerythritol terpene resins (typically Dertoline P2L) or resins based on terpene phenol (typically Dertophene T105 from DRT).

In embodiments, the curable compositions may include at least one photoinitiator and are curable with radiant energy. A photoinitiator is a compound that undergoes a photoreaction on absorption of light, producing reactive species. The reactive species which are generated then initiate polymerization of the reactive components of the curable composition, for example, the ethylenically unsaturated groups. Generally, when the compounds present in the reactive components contain carbon-carbon double bonds, such polymerization (curing) involves reaction of such carbon-carbon double bonds. The reactive species may be, for example, a free radical species or an anionic species, in various embodiments. Suitable photoinitiators include, for example, alpha-hydroxy ketones, phenylglyoxylates, benzyldimethylketals, alpha-aminoketones, mono-acyl phosphines, bis-acyl phosphines, metallocenes, phosphine oxides, benzoin ethers and benzophenones and combinations thereof. Further examples of photoinitiators include α-hydroxyketones, phenylglyoxylates, benzyldimethylketals, α-aminoketones, mono-acyl phosphines, bis-acyl phosphines, phosphine oxides, metallocenes and combinations thereof. In embodiments, the at least one photo-initiator may include diphenyl(2,4,6-trimethylbenzoyl)phosphine oxide (TPO).

In example embodiments, the photoinitiator may be a free-radical initiator and/or a cationic initiator. Photoinitiators may be included in the curable compositions in amounts ranging from about 1 wt. % to about 10 wt. % such as from about 1 wt. % to about 8 wt. %, or from about 1 wt. % to about 6 wt. %, or from about 2 wt. % to about 6 wt. %, or from 2 wt. % to 6 wt. %. The amount of photoinitiator in the curable composition may be chosen based on the thickness of the application of the uncured curable composition. The amount of photoinitiator in the curable composition may be included the least amount necessary to obtain effective initiation of cure at the line speed of the process.

In further embodiments, the photoinitiator may be a Type 1 photoinitiator, a Type 2 photoinitiator, a cationic photoinitiator, or a polymer-based photoinitiator.

Type 1 photoinitiators, which are photofragmentation initiators, include benzoin alkyl ethers, benzil ketals, acyloxime esters, and acetophenone derivatives, including dialkoxyacetophenones, hydroxyl alkyl ketones, morpholinoketones, chlorinated acetopheneones, acylphosphine oxides and acyl phosphonates.

Type 2 photoinitiators, which are hydrogen abstraction photoinitiators, include benzil and derivatives, benzophenone and derivatives, and thioxanthones. Specific examples of photoinitiators are benzyldimethyl ketal, bis(2,6-dimethoxy benzoyl)(2,4,4-trimethyl pentyl)phosphine-oxide, 2-hydroxy-2-methyl-1-phenyl-1-propanone, diphenyl(2,4,6-trimethylbenzoyl) phosphine oxides, 1-hydroxycyclohexyl phenyl ketone, 2-benzyl-2-(dimethylamino)-1-4-(4-morpholinyl)phenyl-1-butanone, isopropylthioxanthone, α-α-dimethoxy-α-phenyl-acetophenone, 2-methyl-1-4-(methylthio)phenyl-2-(4-morpholinyl)-1-propanone, 2,2-diethoxyacetophenone, 2-hydroxy-1-4-(hydroxyethoxy) phenyl-2-methyl-1-propanone.

In one embodiment, combinations of photoinitiators may be used to achieve the best possible cure of coating compositions, e.g., to ensure both surface cure and depth cure. The cure process is generally more efficient in the absence of oxygen, for example, in the presence of nitrogen, so a greater amount of photoinitiator is generally required in the presence of oxygen. Commercial examples of photoinitiators include Irgacure 819, Irgacure 907, Irgacure 2959, Irgacure 651, Irgacure 184, Irgacure 369, Irgacure 1700 and Darocur 1173, available from Ciba Specialty Chemicals as well as Genocure LBP available from Rahn and Esacure KIP150 available from Sartomer. Furthe example photoinitiators include organometallic titanocene photoinitiators such as Irgacure® 784 bis(.eta.5-2,4-cyclopentadien-1-ye-bis(2,6-difluoro-3-(1H-pyrrol-1-yl)-phenyl) titanium.

Examples of cationic photoinitiators include sulfonium salts, iodonium salts and onium salts. Included among such cationic photoinitiators are sulfonium salts. Included among sulfonium salts are aromatic sulfonium salts. Specific examples thereof include triphenylsulfonium salts, methyldiphenylsulfonium salts, dimethylphenylsulfonium salts, diphenylnaphthylsulfonium salts and di(methoxy-naphthyl)methylsulfonium salts. Included among such aromatic sulfonium salts are aromatic sulfonium salts with hexafluorophosphate ions ($PF_6^-$) or hexafluoroantimonate ions ($SbF_6^-$) as counterions. Specific examples include triphenylsulfonium hexafluorophosphate, methyldiphenyl-sulfonium hexafluorophosphate, dimethylphenyl-sulfonium hexafluorophosphate, diphenylnaphthyl-sulfonium hexafluorophosphate, di(methoxynaphthyl)methyl-sulfonium hexafluoro-phosphate and triarylsulfonium hexafluoroantimonate (e.g., Cyracure UVI6976).

Furthermore, it is also possible to use photoinitiators which are polymer-bonded photoinitiators. Polymer-bonded photoinitiators may be obtained by reacting a low molecular mass photoinitiator having a functional group capable of reacting with an isocyanate, such as an amino or a hydroxyl group, with a high molecular mass compound having at least one isocyanate group. Alternatively, they are obtained by reacting functional groups on the photinititator capable of reacting with complementary functional groups on (meth) acrylate monomers, followed by copolymerisation into poly (meth)acrylate polymers.

Additional examples of suitable photoinitiators include but are not limited to, 2-methyl anthraquinone, 2-ethyl anthraquinone, 2-chloroanthraquinone, 2-benzyanthraquinone, 2-t-butylanthraquinone, 1,2-benzo-9,10-anthraquinone, benzyl, benzoin, benzoin methyl ether, benzoin ethyl ether, benzoin isopropyl ether, alpha-methylbenzoin, alpha-phenylbenzoin, Michler's ketone, benzophenone, 4,4'-bis-(diethylamino) benzophenone, acetophenone, 2,2-diethyloxyacetophenone, diethyloxyacetophenone, 2-isopropylthioxanthone, thioxanthone, diethyl thioxanthone, acetylnaphthalenes, ethyl-p-dimethylaminobenzoate, benzil ketone, α-hydroxy keto, 2,4,6-trimethylbenzoyldiphenyl phosphinoxide, benzyl dimethyl ketal, benzil ketal (2,2-dimethoxy-1,2-diphenylethanone), 1-hydroxycylclohexyl phenyl ketone, 2-methyl-1-[4-(methylthio) phenyl]-2-morpholinopropanone-1, 2-hydroxy-2-methyl-1-phenyl-propanone, oligomeric α-hydroxy ketone, phenylbis(2,4,6-trimethylbenzoyl)phosphine oxide, ethyl-4-dimethylamino benzoate, ethyl(2,4,6-trimethylbenzoyl)phenyl phosphinate, anisoin, anthraquinone, anthraquinone-2-sulfonic acid, sodium salt monohydrate, (benzene) tricarbonylchromium, benzil, benzoin isobutyl ether, benzophenone/1-hydroxycyclohexyl phenyl ketone (50/50 blend), 3,3',4,4'-benzophenonetetracarboxylic dianhydride, 4-benzoylbiphenyl, 2-benzyl-2-(dimethylamino)-4'-morpholinobutyrophenone, 4,4'-bis(diethylamino)benzophenone, 4,4'-bis(dimethylamino) benzophenone, camphorquinone, 2-chlorothioxanthen-9-one, dibenzosuberenone, 4,4'-dihydroxybenzophenone, 2,2-dimethoxy-2-phenylacetophenone, 4-(dimethylamino) benzophenone, 4,4'-dimethylbenzil, 2,5-dimethylbenzophenone, 3,4-dimethylbenzophenone, diphenyl(2,4,6-trimethylbenzoyl)phosphine oxide/2-hydroxy-2-methylpropiophenone (50/50 blend), 4'-ethoxyacetophenone, 2,4,6-trimethylbenzoyldiphenylphophine oxide, phenyl bis(2,4,6-trimethyl benzoyl)phosphine oxide, ferrocene, 3 '-hydroxyacetophenone, 4'-hydroxyacetophenone, 3-hydroxybenzophenone, 4-hydroxybenzophenone, 1-hydroxycyclohexyl phenyl ketone, 2-hydroxy-2-methylpropiophenone, 2-methylbenzophenone, 3-methylbenzophenone, methybenzoylformate, 2-methyl-4'-(methylthio)-2-morpholinopropiophenone, phenanthrenequinone, 4'-phenoxyacetophenone, (cumene)cyclopentadienyl iron (ii) hexafluorophosphate, 9,10-diethoxy and 9,10-dibutoxyanthracene, 2-ethyl-9,10-dimethoxyanthracene, thioxanthen-9-one and combinations thereof.

Exemplary combinations of suitable photoinitiators include blends of 2-hydroxy-2-methyl-1-phenyl-1-propanone, 2,4,6-trimethylbenzoylphenylphosphinic acid ethyl ester and phenylbis(2,4,6-trimethylbenzoyl) phosphine oxide and blends of 2-hydroxy-2-methyl-1-phenyl-1-propanone and diphenyl (2,4,6-trimethylbenzoyl) phosphine oxide.

The preferred photoinitiators are able to initiate free-radical polymerization of olefinically unsaturated double bonds upon exposure to radiation. Typical radiation includes UV, Infrared, Near Infrared, X-ray, microwave and/or electron radiation as well as sonication. Preferred is UV radiation with a wavelength to match the absorption profile of the photoinitiators, which is preferably from about 260 nm to about 480 nm.

In some embodiments, the curable compositions do not include any photoinitiator and are curable with electron beam energy. In embodiments, the curable compositions include at least one free radical initiator and/or accelerator and are curable chemically. The at least one free radical initiator may include a peroxide or hydro-peroxide and the accelerator may comprise tertiary amines or other reducing agents based on metal salts.

In embodiments, the curable composition may include from 20 wt. % to 50 wt. % urethane (meth)acrylate oligomer, based on the total weight of the curable composition; from 40 wt. % to 75 wt. % mono(meth)acrylate monomer, based on the total weight of the curable composition; from 0 wt. % to 10 wt. % tackifying resin, based on the total weight of the curable composition; from 1 wt. % to 5 wt. % multifunctional crosslinking monomer, based on the total weight of the curable composition; from 0 wt. % to 10 wt. % photoinitiator, based on the total weight of the curable composition; and from 1 wt. % to 10 wt. % ethylene-vinyl acetate grafted terpolymer, based on the total weight of the curable composition.

In embodiments, the curable composition may include from 25 wt. % to 35 wt. % urethane (meth)acrylate oligomer, based on the total weight of the curable composition; from 50 wt. % to 70 wt. % mono(meth)acrylate monomer, based on the total weight of the curable composition; from 2 wt. % to 5 wt. % tackifying resin, based on the total weight of the curable composition; from 1 wt. % to 3 wt. % multifunctional crosslinking monomer, based on the total weight of the curable composition; from 2 wt. % to 6 wt. % photoinitiator, based on the total weight of the curable composition; and from 2 wt. % to 6 wt. % ethylene-vinyl acetate grafted terpolymer, based on the total weight of the curable composition.

In example embodiments of the curable composition, the urethane (meth)acrylate oligomer is an aliphatic polyester urethane (meth)acrylate oligomer; the at least one mono (meth)acrylate monomer is selected from an isobornyl (meth)acrylate, a propoxylated tetrahydrafurfuryl (meth) acrylate, a cycloaliphatic mono(meth)acrylate, an octyldecyl (meth)acrylate, and combinations thereof; the multifunctional crosslinking monomer comprises 1,4-butanediol methacrylate; and the ethylene-vinyl acetate grafted terpolymer is a random terpolymer of ethylene and vinyl acetate grafted with maleic anhydride.

The curable compositions may optionally contain one or more additives instead of or in addition to the previously mentioned components. Such additives include, but are not limited to, antioxidants, ultraviolet absorbers, photostabilizers, foam inhibitors, flow or leveling agents, colorants, pigments, dispersants (wetting agents), slip additives, fillers (other than or in addition to inorganic nanoparticles), thixotropic agents, matting agents, accelerators, adhesion promoters (such as acidic adhesion promoters), thermoplastics and other types of polymers (other than or in addition to the above-described block copolymers), waxes or other various additives, including any of the additives conventionally utilized in the coating, sealant, adhesive, molding or ink arts.

In embodiments, the curable compositions are liquid at a temperature of 25° C.±2° C. with a viscosity at the same temperature of less than or equal to 2500 cP (mPa·s), less than or equal to 2000 cP, less than or equal to 1500 cP, less than or equal to 1000 cP, from 200 cP to 2000 cP, from 200 cP to 1500 cP, from 200 cP to 1000 cP, from 300 cP to 1000 cP, from 400 cP to 1000 cP, or from 500 cP to 900 cP, for example. In embodiments, the curable compositions include less than 5 wt. % solvent and less than 5 wt. % water, or less than 1 wt. % solvent and less than 1 wt. % water, or are free of solvent, free of water, or free of both solvent and water. The solvents may be non-reactive solvents including ketones such as acetone or methyl ethyl ketone, alkyl acetates such as ethyl acetate or butyl acetate, alcohols such as isopropyl alcohol and ethanol, alkanes such as hexane, alkenes such as toluene and combinations thereof. By non-reactive solvents, it is meant solvents that are saturated and not available for participation in polymerization.

In embodiments, a film or coating may be formed by the curable compositions. In embodiments, methods of coating substrates may comprise applying the curable composition to a substrate and curing the curable composition, wherein the applying includes applying the curable composition at ambient temperature. In embodiments, the substrate may be a high surface energy substrate, such as a metal or a low surface energy substrate, such as plastic. In embodiments, the curable composition may be applied to a substrate by spraying, knife coating, roller coating, casting, drum coating, or dipping, for example.

In embodiments, the curing may include curing by exposure to visible radiation, UV radiation, LED radiation, laser radiation, electron-beam radiation, peroxide, accelerator, or heat, for example. Thus, the curable compositions according to embodiments may be, for example, photo-curable compositions, UV-curable compositions, LED-curable compositions, laser-curable compositions, electron-beam curable compositions, peroxide-curable compositions, or heat-curable compositions. In embodiments, the curing may include combinations of these curing techniques. In example embodiments, a layer of the curable compositions described herein may be exposed to energy for a time effective to cause cross-linking of the at least one urethane (meth)acrylate oligomer and the at least one mono(meth)acrylate monomer to cure the applied compositions. The intensity and/or wavelength may be adjusted as desired to achieve the desired extent of curing. The time period of exposure is not particularly limited, so long as the time period is effective to cure the compositions into a cured adhesive layer. Timeframes for exposure to energy to cause sufficient crosslinking are not particularly limited and may be at least 5 seconds or at least 30 seconds or at least 1 minute or at least 5 minutes or at least 10 minutes, for example.

The curable compositions described herein may include (1) a urethane (meth)acrylate oligomer having a number-average molecular weight of at least 6000 g/mol, at least 7000 g/mol, at least 8000 g/mol, from 7000 g/mol to 75,000 g/mol, from 7000 g/mol to 75,000 g/mol, from 8000 g/mol to 75,000 g/mol, from 6000 g/mol to 50,000 g/mol, from 6000 g/mol to 30,000 g/mol, from 6000 g/mol to 20,000 g/mol, from 6000 g/mol to 15,000 g/mol, from 7000 g/mol to 15,000 g/mol, from 7000 g/mol to 12,000 g/mol, or from 8000 g/mol to 10,000 g/mol; (2) at least one mono(meth) acrylate monomer; (3) a multifunctional crosslinking monomer chosen from (meth)acrylate monomers, methacrylate monomers, or combinations thereof; and (4) an ethylene-vinyl acetate grafted terpolymer. In embodiments, the ingredients (1)-(4) make up 100% by weight of the curable composition. In other embodiments, the curable compositions may further include other ingredients, such as an additive chosen from photoinitiators, multifunctional monomers, wetting agents, adhesion promoters, fillers, rheology modifiers, thixotropic agents, plasticizers, UV absorbers, UV stabilizing agents, dispersants, antioxidants, antistatic agents, lubricants, opacifying agents, anti-foam agents, rheology agents, or combinations of any of the foregoing additives.

In embodiments, sufficient amounts of an initiator system comprising at least one photo-initiator may be optionally included in the compositions so as to render the compositions curable with radiant energy, such as UV light. For example, the compositions may include from about 1% by weight to about 10% by weight initiator system, or about 2% to about 6% by weight initiator system, based on the total weight of the curable composition.

In embodiments, sufficient amounts of an initiator system comprising at least one free radical initiator and/or accelerator may be optionally included in the curable compositions so as to render the curable compositions as chemically curable. Preferably, the curable compositions may include from about 0.1% by weight to about 20% by weight of the initiator system, preferably about 2% to about 15% by weight. Suitable free radical initiators for use in the curable compositions described herein may include peroxides and hydro-peroxides and suitable accelerators may include tertiary amines or other reducing agents based on metal salts. Such chemical curing may also take place at lower temperatures when using accelerators.

In embodiments, sufficient amounts of at least one multifunctional monomer and/or wetting agent may be optionally included in the composition. Such additives may be present in the compositions described herein from about 0.1% by weight to about 20% by weight or from about 1% to about 10% by weight.

In embodiments, the compositions comprise less than 5% by weight of solvent and less than 5% by weight of water or less than 3% by weight of solvent and less than 3% by weight of water or less than 1% by weight of solvent and less than 1% by weight of water or less than 0.5% by weight of solvent and less than 0.5% by weight of water. Preferably, the compositions do not comprise any solvent and do not comprise any water. The solvents may be non-reactive solvents including ketones such as acetone or methyl ethyl ketone, alkyl acetates such as ethyl acetate or butyl acetate, alcohols such as isopropyl alcohol and ethanol, alkanes such as hexane, alkenes such as toluene and combinations thereof. By non-reactive solvents, it is meant solvents that are saturated and not available for participation in polymerization.

Another subject of the invention relates to a cured composition, which is obtained by the curing of a curable composition as defined above according to embodiments. The cured composition may be a cured adhesive composition. The cured composition may be also a cured coating composition.

Further embodiments include cured adhesive compositions obtained by curing a curable composition as defined above according to embodiments, which cured adhesive may be in the form of a low-tack adhesive layer on a first substrate and operable to be contacted to a second substrate and subsequently heated to form an adhesive bond between the first substrate and the second substrate. In embodiments, the first substrate is an ethylene-vinyl acetate foam and the second substrate is nylon fabric. In embodiments, the first substrate is a sole for a shoe and the second substrate is an upper for a shoe, such that the combination of the first substrate adhesively bonded to the second substrate forms a shoe.

Further embodiments include a final product produced by using a curable composition as defined above to bond two or more than two substrates to form the final product. The substrate may be any commercially relevant substrate, such as a high surface energy substrate or a low surface energy substrate, such as a metal substrate or plastic substrate, respectively. The substrates may comprise stainless steel, paper, cardboard, glass, polyolefins, EVA, nylon, PET, PVC, PMMA, PC, composites and wood.

Polymer laminates according to embodiments include a first substrate bonded to a second substrate.

Methods for bonding a first substrate to a second substrate according to embodiments include applying to the first substrate a curable composition according to any of the embodiments previously described. The methods further include exposing the curable composition to UV radiation to form a low-tack adhesive layer. The methods further include contacting the second substrate to the low-tack adhesive layer. The methods further include heating the low-tack adhesive layer to form a bond between the first substrate and the second substrate.

Aspects of the invention disclosed in this specification include:

In a first aspect, a curable composition comprising: a urethane (meth)acrylate oligomer having a number-average molecular weight of at least 6000 g/mol; at least one mono(meth)acrylate monomer; a multifunctional crosslinking monomer chosen from acrylate monomers, methacrylate monomers, or combinations thereof; and an ethylene-vinyl acetate grafted terpolymer.

In a second aspect, the curable composition of the first aspect, wherein the multifunctional crosslinking monomer is chosen from diacrylate monomers, dimethacrylate monomers, or combinations thereof.

In a third aspect, the curable composition of the first or second aspect, wherein the ethylene-vinyl acetate grafted terpolymer is an ethylene-vinyl acetate grafted with maleic anhydride.

In a fourth aspect, the curable composition of any of the first through third aspects, wherein the at least one mono (meth)acrylate monomer comprises: at least one moderate-Tg mono(meth)acrylate having a glass transition temperature of from greater than 30° C. to 175° C.; and at least one low-Tg mono(meth)acrylate having a glass transition temperature from −50° C. to 30° C.

In a fifth aspect, the curable composition of the fourth aspect, wherein: the at least one moderate-Tg mono(meth) acrylate has a glass transition temperature of from 50° C. to 75° C.; and the at least one low-Tg mono(meth)acrylate has a glass transition temperature from −30° C. to −10° C.

In a sixth aspect, the curable composition of any of the first through fifth aspects, comprising: from 20 wt. % to 50 wt. % urethane (meth)acrylate oligomer, based on the total weight of the curable composition; from 40 wt. % to 75 wt. % mono(meth)acrylate monomer, based on the total weight of the curable composition; from 1 wt. % to 5 wt. % multifunctional crosslinking monomer, based on the total weight of the curable composition; and from 1 wt. % to 10 wt. % ethylene-vinyl acetate grafted terpolymer, based on the total weight of the curable composition.

In a seventh aspect, the curable composition of any of the first through sixth aspects, wherein: the urethane (meth) acrylate oligomer is an aliphatic polyester urethane (meth) acrylate oligomer; the at least one mono(meth)acrylate monomer is selected from an isobornyl (meth)acrylate, a propoxylated tetrahydrafurfuryl (meth)acrylate, a cycloaliphatic mono(meth)acrylate, an octyldecyl (meth)acrylate, and combinations thereof; the multifunctional crosslinking monomer comprises 1,4-butanediol methacrylate; and the ethylene-vinyl acetate grafted terpolymer is a random terpolymer of ethylene and vinyl acetate grafted with maleic anhydride.

In an eighth aspect, the curable composition of any of the first through seventh aspects, comprising: from 25 wt. % to 35 wt. % aliphatic polyester urethane (meth)acrylate oligomer, based on the total weight of the curable composition; from 50 wt. % to 70 wt. % mono(meth)acrylate monomer selected from an isobornyl (meth)acrylate, a propoxylated tetrahydrafurfuryl (meth)acrylate, a cycloaliphatic mono (meth)acrylate, an octyldecyl (meth)acrylate, and combinations thereof, based on the total weight of the curable composition; from 1 wt. % to 3 wt. % 1,4-butanediol methacrylate, based on the total weight of the curable composition; and from 2 wt. % to 6 wt. % random terpolymer of ethylene and vinyl acetate grafted with maleic anhydride, based on the total weight of the curable composition.

In a ninth aspect, the curable composition of any of the first through eighth aspects, further comprising at least one tackifying resin.

In a tenth aspect, the curable composition of any of the first through ninth aspects, further comprising at least one photoinitiator In an eleventh aspect, the curable composition of any of the first through eighth aspects, further comprising at least one tackifying resin and at least one photoinitiator.

In a twelfth aspect, the curable composition of the eleventh aspect, comprising: from 20 wt. % to 50 wt. % urethane (meth)acrylate oligomer, based on the total weight of the curable composition; from 40 wt. % to 75 wt. % mono(meth) acrylate monomer, based on the total weight of the curable composition; from 0.01 wt. % to 10 wt. % tackifying resin, based on the total weight of the curable composition; from 1 wt. % to 5 wt. % multifunctional crosslinking monomer, based on the total weight of the curable composition; from 1 wt. % to 10 wt. % photoinitiator, based on the total weight of the curable composition; and from 1 wt. % to 10 wt. % ethylene-vinyl acetate grafted terpolymer, based on the total weight of the curable composition.

In a thirteenth aspect, the curable composition of the eleventh or twelfth aspect, comprising: from 25 wt. % to 35 wt. % urethane (meth)acrylate oligomer, based on the total weight of the curable composition; from 50 wt. % to 70 wt. % mono(meth)acrylate monomer, based on the total weight of the curable composition; from 2 wt. % to 5 wt. % tackifying resin, based on the total weight of the curable composition; from 1 wt. % to 3 wt. % multifunctional crosslinking monomer, based on the total weight of the curable composition; from 2 wt. % to 6 wt. % photoinitiator, based on the total weight of the curable composition; and from 2 wt. % to 6 wt. % ethylene-vinyl acetate grafted terpolymer, based on the total weight of the curable composition.

In a fourteenth aspect, the curable composition of any of the eleventh through thirteenth aspects, wherein: the urethane (meth)acrylate oligomer is an aliphatic polyester urethane (meth)acrylate oligomer; the at least one mono(meth) acrylate monomer is selected from an isobornyl (meth) acrylate, a propoxylated tetrahydrafurfuryl (meth)acrylate, a cycloaliphatic mono(meth)acrylate, an octyldecyl (meth) acrylate, and combinations thereof; the multifunctional crosslinking monomer comprises 1,4-butanediol methacrylate; and the ethylene-vinyl acetate grafted terpolymer is a random terpolymer of ethylene and vinyl acetate grafted with maleic anhydride.

In a fifteenth aspect, a bondable material comprising: a substrate; and a low-tack adhesive layer on a surface of the substrate, the low-tack adhesive layer formed by exposing a curable composition according to any one of the first through fourteenth aspects to curing to visible radiation, UV radiation, LED radiation, laser radiation, electron-beam radiation, peroxide, accelerator, or heat to cure the curable composition.

In a sixteenth aspect, the bondable material of the fifteenth aspect, wherein the substrate is an ethylene-vinyl acetate foam.

In a seventeenth aspect, a method for bonding a first substrate to a second substrate, the method comprising: applying a curable composition according to any one of the first through fourteenth aspects to the first substrate; exposing the curable composition to visible radiation, UV radiation, LED radiation, laser radiation, electron-beam radiation, peroxide, accelerator, or heat to at least partially cure the curable composition and form a low-tack adhesive layer; contacting the second substrate to the low-tack adhesive layer; and heating the low-tack adhesive layer to bond the first substrate to the second substrate and form a laminate.

In an eighteenth aspect, the method of the seventeenth aspect, wherein the first substrate is an ethylene-vinyl acetate foam and the second substrate is a nylon fabric.

In a nineteenth aspect, the method of the seventeenth or eighteenth aspect, wherein the first substrate is a sole of a shoe and the second substrate is an upper of a shoe.

In a twentieth aspect, a laminate prepared by the method according to any of the seventeenth through nineteenth aspects.

In a twenty-first aspect, a curable composition according to any of the first through fourteenth aspects, wherein the curable composition is curable by exposure to visible radiation, UV radiation, LED radiation, laser radiation, electron-beam radiation, peroxide, accelerator, heat, or any combination of the foregoing.

Within this specification embodiments have been described in a way which enables a clear and concise specification to be written, but it is intended and will be appreciated that embodiments may be variously combined or separated without departing from the invention. For example, it will be appreciated that all preferred features described herein are applicable to all aspects of the invention described herein.

In some embodiments, the invention herein can be construed as excluding any element or process step that does not materially affect the basic and novel characteristics of the composition or process. Additionally, in some embodiments, the invention can be construed as excluding any element or process step not specified herein.

Unless otherwise defined, all technical and scientific terms used herein have the same meaning as commonly understood by one of ordinary skill in the art to which the invention belongs. The terminology used in the description herein is for describing particular embodiments only and is not intended to be limiting. As used in the specification and appended claims, the singular forms "a," "an," and "the" are intended to include the plural forms as well, unless the context clearly indicates otherwise.

EXAMPLES

The following examples are intended to illustrate various embodiments of the curable compositions previously described. It should be understood that the following examples are not meant to limit the scope of this disclosure or the appended claims to the specifically illustrated embodiments.

The illustrative curable compositions in the following examples are referenced by an uppercase letter, followed by a hyphen and a sequentially assigned two-digit number. Curable compositions referenced with an "E" (for example, E-01) are exemplary curable compositions according to embodiments of this disclosure that include at least (1) a urethane (meth)acrylate oligomer having an average molecular weight of at least 6000 g/mol; (2) one or more mono(meth)acrylate monomer(s); (3) one or more multifunctional crosslinking monomer(s); and (4) one or more ethylene-vinyl acetate graft terpolymer(s). Curable compositions referenced with a "T" (for example, T-01) are test samples missing at least one of the four ingredients contained in every curable composition referenced with an "E." The test samples are provided as bases for comparison to the exemplary curable compositions and to illustrate the effects of various ingredients on the synergies of the exemplary compositions.

With regard to urethane (meth)acrylate oligomers and mono(meth)acrylate monomers, glass-transition temperature ($T_g$) is characterized as low, moderate, or high. A "low glass-transition temperature" means a glass-transition temperature from −50° C. to 30° C. A "moderate glass-transition temperature" means a glass-transition temperature from greater than 30° C. to 70° C. or, in some embodiments, from 50° C. to 70° C. A "high glass-transition temperature" means a glass-transition temperature greater than 70° C.

In the illustrative examples that follow, various ingredients of the curable compositions prepared in the example are referred to by tradename. For the sake of convenience, the chemical descriptions of the ingredients referred to by tradename will now be provided.

Urethane (Meth)Acrylate Oligomers

PRO13690, available from Sartomer, is a high molecular-weight (number-average molecular weight greater than 6000 g/mol) aliphatic polyester-based urethane acrylate. Upon crosslinking, PRO13690 has a low glass-transition temperature ($T_g$) of about −25° C.

PRO13801, available from Sartomer, is a formulated low-viscosity radiation curable urethane-acrylate pressure-sensitive including PRO13690 aliphatic polyester-based urethane acrylate as an ingredient and containing 5 wt. % photoinitiator (TPO, as defined below). Upon crosslinking, PRO13801 has a low glass-transition temperature f about −20° C.

CN966J75, available from Sartomer, is about 75% by weight low molecular-weight (number-average molecular weight less than 5500 g/mol) aliphatic polyester-based urethane diacrylate oligomer, blended with 25% by weight SR506C, described below. Upon crosslinking, CN966J75 has a low glass-transition temperature.

CN9071, available from Sartomer, is a high molecular-weight (number-average molecular weight greater than 6000 g/mol) aliphatic urethane acrylate oligomer. Upon crosslinking, CN9071 has a low glass-transition temperature.

Mono(Meth)Acrylate Monomers

SR506C, available from Sartomer, is a monoacrylate monomer, particularly an isobornyl acrylate. Upon curing, the isobornyl group produces polymers through free radical curing that have a high glass-transition temperature.

SR611, available from Sartomer, is a monoacrylate monomer, particularly a propoxylated tetrahydrafurfitryl acrylate. Upon curing, the SR611 produces polymers that have a low glass-transition temperature.

SR420, available from Sartomer, is a low-viscosity monofunctional cycloaliphatic monoacrylate monomer, particularly a 3,3,5-trimethyl cyclohexyl acrylate. Upon curing, the SR420 produces polymers that have a moderate glass-transition temperature.

SR484, available from Sartomer, is a monoacrylate monomer with a long, chain hydrophobic backbone, particularly an octyldecyl acrylate. Upon curing, the SR484 produces polymers that have a low glass-transition temperature ($T_g$).

Tackifiers

Sylvatac™ RE25, available from Kraton, is a rosin ester, particularly a low softening point ester of tall oil resin.

Multifunctional Crosslinking Monomers

SR214, available from Sartomer, is a difunctional dimethacrylate monomer, particularly a 1,4-butanediol dimethacrylate.

EVA Terpolymers

Orevac® T9305, available from Arkema, is an ethylene vinyl acetate maleic anhydride grafted terpolymer, particularly a random terpolymer of ethylene, vinyl acetate and maleic anhydride, made by high-pressure radicular polymerization process. Orevac® T9305 generally contains, by weight, up to about 70% ethylene units, 26% to 30% vinyl acetate units, and about 6400 ppm maleic anhydride units.

Photoinitiators

TPO is diphenyl(2,4,6-trimethylbenzoyl)phosphine oxide.

Other Ingredients

SR9050, available from Sartomer, is a monofunctional acid-ester adhesion promoter including a mixture of methacrylic acid ester and 2-(2-Ethoxyethoxy)ethyl acrylate.

Example 1

General Formulation and Testing Procedures

General Formulation Procedure for Curable Compositions

Curable compositions are prepared by first modifying or diluting a polyester-based urethane (meth)acrylate oligomer, optionally containing a photoinitiator, by combining the oligomer with one or more mono(meth)acrylate monomers to form a first mixture. The mono(meth)acrylate monomers reduce viscosity of the oligomer and aid wetting during application of the final formulation to a substrate.

A second mixture is prepared of all remaining ingredients such as an ethylene-vinyl acetate grafted terpolymer, an adhesion promoter such as a phosphate ester, a tackifier, and one or more dimethacrylate crosslinking monomers. The first and second mixtures are stirred separately with an overhead mixer equipped with a mechanical stirrer until homogeneous. The first mixture and the second mixture then are combined. The resulting final mixture is heated at 60° C. in a lab oven and mixed with the overhead mixer at moderate shear until homogeneous to form the curable composition.

Adhesive Application and Curing

The curable compositions prepared by the foregoing formulation procedure are applied by a foam applicator to a foamed ethylene-vinyl acetate (EVA) substrate to yield a layer approximately 2 mil (0.05 mm) thick. The adhesive-coated EVA foam samples are cured with one pass at 50 feet per minute under a Fusion H ultraviolet bulb having a nominal wattage of 600 Watts per inch (wpi). The cured adhesive is then conditioned for 24 hours at 72° F. (22.2° C.) in an environment at 50% relative humidity before heat lamination.

Heat Lamination Procedure

Nylon upper fabric is laminated onto the cured tack-free adhesive-coated EVA sole substrate with a 1-pound (0.45 kg) roller. The laminate is then placed between pre-heated aluminum test panels and placed in a Carver Hydraulic Press at 70° C. and about 100 psi for 1 minute. Laminates are held at room temperature overnight before further testing.

Adhesion Testing

The heat lamination samples are tested for T-peel adhesion following ASTM D1876 (which testing procedure is incorporated by reference in its entirety) immediately after curing or after conditioning at 72° F. (22.2° C.), 50% relative humidity for 24 hours. The mode of failure may be cohesive, adhesive, or destructive.

Example 2

Comparative Test Samples

Test samples T-01, T-02, and T-03 were prepared and tested according to the General Formulation and Testing Procedures of Example 1. Test sample T-01 was a baseline control sample to provide tack and adhesion data for a composition including only urethane (meth)acrylate oligomer, with no mono(meth)acrylate, no crosslinking monomer, and no EVA terpolymer. Test samples T-02 and T-03 were 80/20 (w/w) mixtures of the same urethane (meth) acrylate oligomer dissolved in a combination of one mono (meth)acrylate monomer (SR484 or SR420) and an EVA terpolymer (Orevac® T9305). The SR484 and SR420 mono (meth)acrylate monomers were chosen in part to demonstrate differences with respect to monomers having different glass-transition temperatures upon curing. Specifically, SR484 upon curing forms polymers with a lower Tg than that of polymers formed from SR420 upon curing. The compositions and properties of the test samples are provided in Table 1.

TABLE 1

Ingredients and Properties

| Curable Compositions | | | | |
|---|---|---|---|---|
| | | Weight Percent Composition Reference | | |
| Component | Ingredient | T-01 | T-02 | T-03 |
| UA Oligomer | PRO13801 | 100.0 | 80.00 | 80.00 |
| Monoacrylate monomer #1 | SR484 | — | 16.00 | — |
| Monoacrylate monomer #2 | SR420 | — | — | 16.00 |
| Crosslinking monomer | [none] | — | — | — |
| EVA Terpolymer | Orevac ® T9305 | — | 4.00 | 4.00 |
| Tackifier | [none] | — | — | — |
| Photoinitiator | TPO | Included as 5% of PRO13801 | | |
| TOTAL | | 100.0 | 100.0 | 100.0 |

| Properties | |
|---|---|
| Test | Performance |
| Probe Tack on EVA after UV Cure | High   High   Moderate |
| EVA to Nylon Lamination T-Peel (lbf/in) | N/A    N/A    2.53 |
| EVA to Nylon Lamination T-Peel (N/m) | N/A    N/A    443 |

Test sample T-01, including only the PRO13801 urethane acrylate exhibited an excessively high viscosity and poor adhesion after curing.

The test samples T-02 and T-03 benefitted from decreased viscosity and increased EVA foam adhesion. It is believed that the addition of EVA grafted terpolymer significantly increased the EVA foam adhesion.

Test sample T-02 including the lower Tg SR484 monoacrylate exhibited high tack. Test sample T-03 including the higher Tg SR420 monoacrylate exhibited lower viscosity and reduced tack than those of test sample T-02. In Formulation 4 a dimethacrylate crosslinking monomer was added to Formulation 3 and effectively further reduced tack and significantly increased T-Peel strength.

Example 3

Example composition E-01 was prepared and tested according to the General Formulation and Testing Procedures of Example 1. Composition E-01 was a modified formulation from test sample T-03, in which portions of the urethane acrylate, the monoacrylate monomer, and the EVA terpolymer were replaced with SR214 diacrylate crosslinking monomer. The composition and properties of composition E-01 are provided in Table 2.

TABLE 2

Ingredients and Properties

| Curable Composition | | |
|---|---|---|
| | | Weight Percent Composition Reference |
| Component | Ingredient | E-01 |
| UA Oligomer | PRO13801 | 79.20 |
| Monoacrylate monomer #1 | SR484 | — |
| Monoacrylate monomer #2 | SR420 | 15.84 |
| Crosslinking monomer | SR214 | 1.00 |
| EVA Terpolymer | Orevac ® T9305 | 3.96 |
| Tackifier | [none] | — |
| Photoinitiator | TPO | Included as 5% of PRO13801 |
| TOTAL | | 100.0 |

| Properties | |
|---|---|
| Test | Performance |
| Probe Tack on EVA after UV Cure | Low |
| EVA to Nylon Lamination T-Peel (lbf/in) | 5.60 |
| EVA to Nylon Lamination T-Peel (N/m) | 981 |

The addition of the dimethacrylate crosslinking monomer to composition E-01 was determined to further reduce tack and to more than double T-Peel strength, compared to the test sample T-03.

Example 4

Example compositions E-02, E-03, and E-04 were prepared and tested according to the General Formulation and Testing Procedures of Example 1. Each of the example compositions E-02, E-03, and E-04 included identical weight fractions of three monoacrylate monomers (SR506C, SR611, and SR420), a crosslinking monomer (SR214), and a photoinitiator. The urethane acrylate oligomer in each composition was PRO13690, and the EVA terpolymer was Orevac® T9305. Compositions E-02 and E-04 included a tackifier (Sylvatac™ RE25). Composition E-03 was a modification of composition E-02, in which the tackifier was replaced with an equal weight of additional urethane acrylate oligomer. Composition E-04 was a modification of composition E-02, in which a portion of the urethane acrylate oligomer was replaced by an equal weight of additional EVA terpolymer. The composition and properties of compositions E-02, E-03, and E-04 are provided in Table 3.

TABLE 3

Ingredients and Properties

Curable Compositions

| Component | Ingredient | Weight Percent Composition Reference | | |
|---|---|---|---|---|
| | | E-02 | E-03 | E-04 |
| UA Oligomer | PRO13690 | 30.71 | 33.00 | 28.66 |
| Monoacrylate monomer #1 | SR506C | 25.18 | 25.18 | 25.18 |
| Monoacrylate monomer #2 | SR611 | 17.10 | 17.10 | 17.10 |
| Monoacrylate monomer #3 | SR420 | 15.83 | 15.83 | 15.83 |
| Crosslinking monomer | SR214 | 0.99 | 0.99 | 0.99 |
| EVA Terpolymer | Orevac ® T9305 | 3.95 | 3.95 | 6.00 |
| Tackifier | Sylvatac ™ RE25 | 2.29 | — | 2.29 |
| Photoinitiator | TPO | 3.95 | 3.95 | 3.95 |
| TOTAL | | 100.0 | 100.0 | 100.0 |

Properties of Curable Compositions

| Property | Performance | | |
|---|---|---|---|
| Viscosity @25° C. (cP) | 722 | 762 | 675 |
| Density (lbs/gal) | 8.5136 | 8.5526 | 8.5164 |
| Density (g/cm³) | 1.0202 | 1.0248 | 1.0205 |
| Condition | dissolved | dissolved | dissolved |

Properties of EVA-to-Nylon Lamination

| Property | Performance | | |
|---|---|---|---|
| Surface tack after curing (lbf) | 0.029 | 0.048 | 0.127 |
| Surface tack after curing (N) | 0.129 | 0.214 | 0.565 |
| T-Peel Adhesion (lbf/in) | 4.28 | 5.27 | 8.54 |
| T-Peel Adhesion (N/m) | 750. | 923 | 1495 |

The formulations based on the higher molecular weight PRO13690 urethane acrylate oligomer exhibited better compatibility with the terpolymer adhesion promoter, compared to that of example composition E-01 based on PRO13801. Compositions E-02 and E-03 with a lower EVA terpolymer loading than that of composition E-04 exhibited lower tack values but also exhibited lower peel strengths than that of composition E-04. Somewhat unexpectedly, replacement of the tackifier with additional urethane acrylate oligomer in composition E-03 compared to composition E-02 resulted in increased peel strength. Decreasing the oligomer loading with additional EVA terpolymer adhesion promoter in composition E-05 yielded slightly higher tack compared to that of composition E-03 but also yielded a significantly greater peel strength compared to that of composition E-03.

Example 5

Test compositions T-04 and T-05 were prepared and tested according to the General Formulation and Testing Procedures of Example 1. Test composition T-04 was a modification of example composition E-02 (see Example 4), in which the urethane acrylate oligomer PRO13690 was replaced with an equal weight amount of the lower molecular-weight urethane acrylate oligomer CN966J75. Test composition T-05 was a modification of example composition E-03 (see Example 4), in which the urethane acrylate oligomer PRO13690 was replaced with an equal weight amount of the lower molecular-weight urethane acrylate oligomer CN966J75. Accordingly, test composition T-04 differed from test composition T-05 only in that the tackifier present in T-04 was replaced with an equal weight of additional urethane acrylate oligomer into T-05. The composition and properties of compositions T-04 and T-05 are provided in Table 4.

TABLE 4

Ingredients and Properties

Curable Compositions

| Component | Ingredient | Weight Percent Composition Reference | |
|---|---|---|---|
| | | T-04 | T-05 |
| UA Oligomer | PRO13690 | — | — |
| UA Oligomer (low MW) | CN966J75 | 30.71 | 33.00 |
| Monoacrylate monomer #1 | SR506C | 25.18 | 25.18 |
| Monoacrylate monomer #2 | SR611 | 17.10 | 17.10 |
| Monoacrylate monomer #3 | SR420 | 15.83 | 15.83 |
| Crosslinking monomer | SR214 | 0.99 | 0.99 |
| EVA Terpolymer | Orevac ® T9305 | 3.95 | 3.95 |
| Tackifier | Sylvatac ™ RE25 | 2.29 | — |
| Photoinitiator | TPO | 3.95 | 3.95 |
| TOTAL | | 100.0 | 100.0 |

Properties of Curable Compositions

| Property | Performance | |
|---|---|---|
| Viscosity @25° C. (cP) | 315 | 286 |
| Density (lbs/gal) | 8.5443 | 8.5563 |
| Density (g/cm³) | 1.0238 | 1.0253 |
| Condition | dropped out | dropped out |

Properties of EVA-to-Nylon Laminations

| Property | Performance | |
|---|---|---|
| Surface tack after curing (lbf) | N/A | N/A |
| Surface tack after curing (N) | N/A | N/A |
| T-Peel Adhesion (lbf/in) | N/A | N/A |
| T-Peel Adhesion (N/m) | N/A | N/A |

Test compositions T-04 and T-05 evidenced decreased compatibility of the lower molecular weight urethane acrylate CN966J75 and the EVA terpolymer adhesion promoter. The curable compositions T-04 and T-05 themselves did not form homogeneous mixtures conducive to performing either surface tack measurements or adhesion testing on a lamination.

Example 6

Test composition T-06 was prepared and tested according to the General Formulation and Testing Procedures of Example 1. Test composition T-06 was a single modification of example composition E-02 (see Example 4), in which the EVA terpolymer was replaced with an equal weight amount of a monofunctional adhesion promoter (SR9050). The composition and properties of test composition T-06 is provided in Table 5.

TABLE 5

| | Ingredients and Properties | |
|---|---|---|
| | Curable Composition | |
| Component | Ingredient | Weight Percent Composition Reference T-06 |
| UA Oligomer | PRO13690 | 30.71 |
| Monoacrylate monomer #1 | SR506C | 25.18 |
| Monoacrylate monomer #2 | SR611 | 17.10 |
| Monoacrylate monomer #3 | SR420 | 15.83 |
| Crosslinking monomer | SR214 | 0.99 |
| EVA Terpolymer | Orevac ® T9305 | — |
| Monofunctional Adhesion Promoter | SR9050 | 3.95 |
| Tackifier | Sylvatac ™ RE25 | 2.29 |
| Photoinitiator | TPO | 3.95 |
| TOTAL | | 100.0 |
| Properties of Curable Composition | | |
| Property | | Performance |
| Viscosity @25° C. (cP) | | 280 |
| Density (lbs/gal) | | 8.5735 |
| Density (g/cm$^3$) | | 1.0273 |
| Condition | | well dissolved |
| Properties of EVA-to-Nylon Lamination | | |
| Property | | Performance |
| Surface tack after curing (lbf) | | 0.08 |
| Surface tack after curing (N) | | 0.36 |
| T-Peel Adhesion (lbf/in) | | 4.06 |
| T-Peel Adhesion (N/m) | | 711 |

Test composition T-06 demonstrated a substantial increase in surface tack and a modest reduction in peel strength compared to similar measurements for example composition E-02, attributable to replacing the EVA terpolymer adhesion promoter with an equal weight of the acid-ester adhesion promoter.

Example 7

Example compositions E-05, E-06, and E-07 were prepared and tested according to the General Formulation and Testing Procedures of Example 1.

Example composition E-05 was a single modification of example composition E-02 (see Example 4), in which the weight fraction of monoacrylate monomer SR214 was increased by substituting a portion of the urethane acrylate oligomer PRO13690 with additional SR214.

Example composition E-06 was a single modification of example composition E-04 (see Example 4), in which the weight fraction of monoacrylate monomer SR214 was increased by substituting a portion of the urethane acrylate oligomer PRO13690 with additional SR214. Accordingly, example composition E-06 differed from example composition E-05 only in that a portion of the urethane acrylate oligomer in E-05 was replaced by an equal weight of additional EVA terpolymer in E-06.

Example composition E-07 was a modification of example composition E-06, in which an equal weight amount of higher molecular weight urethane acrylate oligomer (CN9071) was substituted in place of the PRO13690 oligomer. Accordingly, example composition E-07 differed from example composition E-05 both with respect to the urethane acrylate included in the composition (CN9071 vs. PRO13690) and also in that a portion of the urethane acrylate oligomer in E-05 was replaced by an equal weight of additional EVA terpolymer in E-07.

The compositions and properties of example compositions E-05, E-06, and E-07 are provided in Table 6.

TABLE 6

| | Ingredients and Properties | | | |
|---|---|---|---|---|
| | Curable Compositions | | | |
| | | Weight Percent Composition Reference | | |
| Component | Ingredient | E-05 | E-06 | E-07 |
| UA Oligomer | PRO13690 | 29.72 | 27.67 | — |
| UA Oligomer (high MW) | CN9071 | — | — | 27.67 |
| Monoacrylate monomer #1 | SR506C | 25.18 | 25.18 | 25.18 |
| Monoacrylate monomer #2 | SR611 | 17.10 | 17.10 | 17.10 |
| Monoacrylate monomer #3 | SR420 | 15.83 | 15.83 | 15.83 |
| Crosslinking monomer | SR214 | 1.98 | 1.98 | 1.98 |
| EVA Terpolymer | Orevac ® T9305 | 3.95 | 6.00 | 6.00 |
| Tackifier | Sylvatac ™ RE25 | 2.29 | 2.29 | 2.29 |
| Photoinitiator | TPO | 3.95 | 3.95 | 3.95 |
| TOTAL | | 100.0 | 100.0 | 100.0 |
| Properties of Curable Compositions | | | | |
| Property | | Performance | | |
| Viscosity @25° C. (cP) | | 563.3 | 613.3 | 1098 |
| Density (lbs/gal) | | 8.547 | 8.54 | 8.56 |
| Density (g/cm$^3$) | | 1.024 | 1.02 | 1.03 |
| Condition | | well | well | well |

TABLE 6-continued

| Ingredients and Properties | | | |
|---|---|---|---|
| | dissolved | dissolved | dissolved |
| Properties of EVA-to-Nylon Laminations | | | |
| Property | Performance | | |
| Surface tack immediately after curing (lbf) | 0.021 | 0.111 | 0.063 |
| Surface tack immediately after curing (N) | 0.093 | 0.494 | 0.280 |
| Surface tack 24 hours after curing (lbf) | 0.002-0.01 | N/A | N/A |
| Surface tack 24 hours after curing (N) | 0.009-0.04 | N/A | N/A |
| T-Peel Adhesion after 24 hours (lbf/in) | 8.45 | 4.51 | 3.95 |
| T-Peel Adhesion after 24 hours (N/m) | 1480 | 790. | 692 |

Example composition E-05 with a low loading of EVA terpolymer and an increased loading of dimethacrylate crosslinking monomer exhibited good miscibility, the lowest tack after curing of all example composition E-01 through E-07, and the second highest peel strength of all example composition E-01 through E-07. Example composition E-06, with a lower loading of oligomer compared to E-05, a higher loading of terpolymer compared to E-05, and the same increased loading of dimethacrylate crosslinking monomer as in E-05 also exhibited good miscibility but a slightly higher tack after curing and a significantly lower peel strength compared to E-05. Composition E-07, differing from composition E-06 by only the inclusion of the higher molecular weight oligomer CN9071 in place of PRO13690, exhibited good miscibility, lower tack after cure, and similar peel strength to that of composition E-06.

While particular embodiments have been illustrated and described herein, it should be understood that various other changes and modifications may be made without departing from the scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A curable composition comprising:
   a urethane (meth)acrylate oligomer having a number-average molecular weight of at least 6000 g/mol;
   at least one mono(meth)acrylate monomer;
   a multifunctional crosslinking monomer chosen from acrylate monomers, methacrylate monomers, or combinations thereof; and
   an ethylene-vinyl acetate grafted terpolymer.

2. The curable composition of claim 1, wherein the multifunctional crosslinking monomer is chosen from diacrylate monomers, dimethacrylate monomers, or combinations thereof.

3. The curable composition of claim 1, wherein the ethylene-vinyl acetate grafted terpolymer is an ethylene-vinyl acetate grafted with maleic anhydride.

4. The curable composition of claim any one of claim 1, wherein the at least one mono(meth)acrylate monomer comprises:
   at least one moderate-Tg mono(meth)acrylate having a glass transition temperature of from greater than 30° C. to 175° C.; and
   at least one low-Tg mono(meth)acrylate having a glass transition temperature from −50° C. to 30° C.

5. The curable composition of claim 4, wherein:
   the at least one moderate-Tg mono(meth)acrylate has a glass transition temperature of from 50° C. to 70° C.; and
   the at least one low-Tg mono(meth)acrylate has a glass transition temperature from −30° C. to −10° C.

6. The curable composition of claim 1, comprising:
   from 20 wt. % to 50 wt. % urethane (meth)acrylate oligomer, based on the total weight of the curable composition;
   from 40 wt. % to 75 wt. % mono(meth)acrylate monomer, based on the total weight of the curable composition;
   from 1 wt. % to 5 wt. % multifunctional crosslinking monomer, based on the total weight of the curable composition; and
   from 1 wt. % to 10 wt. % ethylene-vinyl acetate grafted terpolymer, based on the total weight of the curable composition.

7. The curable composition of claim any one of claim 1, wherein:
   the urethane (meth)acrylate oligomer is an aliphatic polyester urethane (meth)acrylate oligomer;
   the at least one mono(meth)acrylate monomer is selected from an isobornyl (meth)acrylate, a propoxylated tetrahydrafurfuryl (meth)acrylate, a cycloaliphatic mono(meth)acrylate, an octyldecyl (meth)acrylate, and combinations thereof;
   the multifunctional crosslinking monomer comprises 1,4-butanediol methacrylate; and
   the ethylene-vinyl acetate grafted terpolymer is a random terpolymer of ethylene and vinyl acetate grafted with maleic anhydride.

8. The curable composition of claim 7, comprising:
   from 25 wt. % to 35 wt. % aliphatic polyester urethane (meth)acrylate oligomer, based on the total weight of the curable composition;
   from 50 wt. % to 70 wt. % mono(meth)acrylate monomer selected from an isobornyl (meth)acrylate, a propoxylated tetrahydrafurfuryl (meth)acrylate, a cycloaliphatic mono(meth)acrylate, an octyldecyl (meth)acrylate, and combinations thereof, based on the total weight of the curable composition;
   from 1 wt. % to 3 wt. % 1,4-butanediol methacrylate, based on the total weight of the curable composition;
   from 2 wt. % to 6 wt. % random terpolymer of ethylene and vinyl acetate grafted with maleic anhydride, based on the total weight of the curable composition.

9. The curable composition of claim any one of claim 1, further comprising at least one tackifying resin.

10. The curable composition of claim any one of claim 1, further comprising at least one photoinitiator.

11. The curable composition of claim any one of claim 1, further comprising at least one tackifying resin and at least one photoinitiator.

12. The curable composition of claim 11, comprising:
from 20 wt. % to 50 wt. % urethane (meth)acrylate oligomer, based on the total weight of the curable composition;
from 40 wt. % to 75 wt. % mono(meth)acrylate monomer, based on the total weight of the curable composition;
from 0.01 wt. % to 10 wt. % tackifying resin, based on the total weight of the curable composition;
from 1 wt. % to 5 wt. % multifunctional crosslinking monomer, based on the total weight of the curable composition;
from 1 wt. % to 10 wt. % photoinitiator, based on the total weight of the curable composition; and
from 1 wt. % to 10 wt. % ethylene-vinyl acetate grafted terpolymer, based on the total weight of the curable composition.

13. The curable composition of claim 11, comprising:
from 25 wt. % to 35 wt. % urethane (meth)acrylate oligomer, based on the total weight of the curable composition;
from 50 wt. % to 70 wt. % mono(meth)acrylate monomer, based on the total weight of the curable composition;
from 2 wt. % to 5 wt. % tackifying resin, based on the total weight of the curable composition;
from 1 wt. % to 3 wt. % multifunctional crosslinking monomer, based on the total weight of the curable composition;
from 2 wt. % to 6 wt. % photoinitiator, based on the total weight of the curable composition; and
from 2 wt. % to 6 wt. % ethylene-vinyl acetate grafted terpolymer, based on the total weight of the curable composition.

14. The curable composition of claim 11, wherein:
the urethane (meth)acrylate oligomer is an aliphatic polyester urethane (meth)acrylate oligomer;
the at least one mono(meth)acrylate monomer is selected from an isobornyl (meth)acrylate, a propoxylated tetrahydrafurfuryl (meth)acrylate, a cycloaliphatic mono(meth)acrylate, an octyldecyl (meth)acrylate, and combinations thereof;
the multifunctional crosslinking monomer comprises 1,4-butanediol methacrylate; and
the ethylene-vinyl acetate grafted terpolymer is a random terpolymer of ethylene and vinyl acetate grafted with maleic anhydride.

15. A bondable material comprising:
a substrate; and
a low-tack adhesive layer on a surface of the substrate, the low-tack adhesive layer formed by exposing a curable composition according to claim 1 to curing by exposure to visible radiation, UV radiation, LED radiation, laser radiation, electron-beam radiation, peroxide, accelerator, or heat, to cure the curable composition.

16. The bondable material of claim 15, wherein the substrate is an ethylene-vinyl acetate foam.

17. A method for bonding a first substrate to a second substrate, the method comprising:
applying a curable composition according to claim 1 to the first substrate;
exposing the curable composition to visible radiation, UV radiation, LED radiation, laser radiation, electron-beam radiation, peroxide, accelerator, or heat to at least partially cure the curable composition and form a low-tack adhesive layer;
contacting the second substrate to the low-tack adhesive layer;
heating the low-tack adhesive layer to bond the first substrate to the second substrate and form a laminate.

18. The method of claim 17, wherein the first substrate is an ethylene-vinyl acetate foam and the second substrate is a nylon fabric.

19. The method of claim 17, wherein the first substrate is a sole of a shoe and the second substrate is an upper of a shoe.

20. A laminate prepared by the method according to claim 17.

21. The laminate of claim 20, wherein the first substrate is an ethylene-vinyl acetate foam and the second substrate is a nylon fabric.

22. The laminate of claim 20, wherein the first substrate is a sole of a shoe and the second substrate is an upper of a shoe.

* * * * *